(12) United States Patent
Chang

(10) Patent No.: US 11,848,699 B1
(45) Date of Patent: Dec. 19, 2023

(54) SYSTEMS AND METHODS FOR FAST END-TO-END, BI-DIRECTIONAL, FIBER TRUNK CERTIFICATION

(71) Applicant: VeEX Inc., Fremont, CA (US)

(72) Inventor: Paul Chang, Fremont, CA (US)

(73) Assignee: VeEX Inc., Fremont, CA (US)

( * ) Notice: Subject to any disclaimer, the term of this patent is extended or adjusted under 35 U.S.C. 154(b) by 0 days.

(21) Appl. No.: 17/490,410

(22) Filed: Sep. 30, 2021

Related U.S. Application Data

(60) Provisional application No. 63/237,730, filed on Aug. 27, 2021.

(51) Int. Cl.
  *H04Q 11/00* (2006.01)
  *H04B 10/079* (2013.01)
  *H04B 10/25* (2013.01)

(52) U.S. Cl.
  CPC ........... *H04B 10/079* (2013.01); *H04B 10/25* (2013.01); *H04Q 11/0062* (2013.01); *H04Q 2011/0083* (2013.01)

(58) Field of Classification Search
  CPC .............................................. H04Q 2011/0083
  See application file for complete search history.

(56) References Cited

U.S. PATENT DOCUMENTS

| | | | |
|---|---|---|---|
| 2014/0193161 A1* | 7/2014 | In De Betou | H04Q 11/0062 398/154 |
| 2016/0028476 A1* | 1/2016 | Storey | H04B 10/035 398/12 |
| 2016/0344482 A1* | 11/2016 | Zhuge | H04B 10/564 |
| 2018/0076884 A1* | 3/2018 | Archambault | H04J 14/0212 |
| 2018/0103303 A1* | 4/2018 | Schell | H04B 10/071 |

\* cited by examiner

*Primary Examiner* — Nathan M Cors
(74) *Attorney, Agent, or Firm* — Sheppard Mullin Richter & Hampton LLP

(57) ABSTRACT

A system comprises an internal optical switch, couplable to a plurality of fibers, configured to automatically select fibers in succession from the plurality of fibers for testing. An optical test module, coupled to the internal optical switch, is configured to generate or receive one or more wavelengths of light on each selected fiber of the plurality of fibers. A communications interface, coupled to the internal optical switch and the optical test module, is configured to establish a communications link between the system and a second system to test each selected fiber.

20 Claims, 5 Drawing Sheets

400

Successively for each fiber of a plurality of fibers to which a system at a first data center and a second system at a second data center are coupled, perform the following:
402

Select the fiber without manual patching associated with selection of the fiber at the first data center
404

Provide, over a communications link between the system and the second system, to the second system an identification of the fiber to cause selection of the fiber by the second system without manual patching associated with the selection of the fiber at the second data center
406

Provide, over the communications link, to the second system first information associated with one or more wavelengths of light associated with the fiber
408

Receive, over the communications link, from the second system second information associated with the one or more wavelengths of light associated with the fiber
410

Calculate a parameter associated with a test of the fiber based on the first information and the second information
412

FIGURE 4

SYSTEMS AND METHODS FOR FAST END-TO-END, BI-DIRECTIONAL, FIBER TRUNK CERTIFICATION

CROSS-REFERENCE TO RELATED APPLICATIONS

This application claims priority to U.S. Provisional Patent Application No. 63/237,730, filed on Aug. 27, 2021 and entitled "SYSTEMS AND METHODS FOR FAST END-TO-END, BI-DIRECTIONAL, FIBER TRUNK CERTIFICATION," which is incorporated herein by reference in its entirety.

FIELD OF THE INVENTION

The present technology relates to optical networks. More particularly, the present technology relates to testing fiber trunks.

BACKGROUND

Optical networks are an important part of modern network infrastructure. Because signaling in optical networks is based on light (e.g., laser), optical networks can have a much higher data throughput than copper-based networks. Furthermore, latency associated with optical networks can be much lower than latency of copper-based networks. An optical network, such as a fiber optic network, can employ various types of fiber optic cables. Fiber optic cables can be tested to analyze their performance.

SUMMARY

Various embodiments of the present technology can include a system comprising: an internal optical switch, couplable to a plurality of fibers, configured to automatically select fibers in succession from the plurality of fibers for testing; an optical test module, coupled to the internal optical switch, configured to generate or receive one or more wavelengths of light on each selected fiber of the plurality of fibers; and a communications interface, coupled to the internal optical switch and the optical test module, configured to establish a communications link between the system and a second system to test each selected fiber.

In some embodiments, components of the second system are the same as components of the system.

In some embodiments, the system is master at a first data center and the second system is slave at a second data center remote from the first data center.

In some embodiments, the plurality of fibers are at least a portion of a fiber trunk.

In some embodiments, the communications interface is further configured to provide and receive information about the one or more wavelengths of light on each selected fiber over the communications link.

In some embodiments, a calculation of a parameter associated with a test of each selected fiber is based at least in part on information about the one or more wavelengths of light on the fiber.

In some embodiments, the internal optical switch is configured to automatically select fibers in succession from the plurality of fibers for coupling to the optical test module without a need for successive manual patching of selected fibers at ends of the plurality of fibers.

In some embodiments, the system further comprises: at least one external optical switch, couplable between the internal optical switch and at least a portion of the plurality of fibers, the at least one external optical switch couplable with the internal optical switch through a fiber connection.

In some embodiments, a first external optical switch couplable with the internal optical switch is couplable to a first portion of the plurality of fibers and a second external optical switch couplable with the internal optical switch is couplable to a second portion of the plurality of fibers.

In some embodiments, the internal optical switch includes a first port associated with the first external optical switch and a second port associated with the second external optical switch, the first port and the second port configured to support transmission of wavelengths of light over, respectively, the first portion of the plurality of fibers and the second portion of the plurality of fibers.

Various embodiments of the present technology can include a system comprising: an external optical switch, couplable to a plurality of fibers, configured to automatically select fibers in succession from the plurality of fibers for testing; an optical test module, couplable to the external optical switch, configured to generate or receive one or more wavelengths of light over each selected fiber of the plurality of fibers; and a communications interface, coupled to the optical test module, configured to establish a communications link between the system and a second system to test each selected fiber.

In some embodiments, components of the second system are the same as components of the system.

In some embodiments, the system is master at a first data center and the second system is slave at a second data center remote from the first data center.

In some embodiments, the plurality of fibers are at least a portion of a fiber trunk.

In some embodiments, the communications interface is further configured to provide and receive information about the one or more wavelengths of light on each selected fiber over the communications link.

Various embodiments of the present technology can include a system, method, and computer readable medium that, successively for each fiber of a plurality of fibers to which the system at a first data center and a second system at a second data center are connected, perform: selecting the fiber without manual patching associated with selection of the fiber at the first data center; providing, over a communications link between the system and the second system, to the second system an identification of the fiber to cause selection of the fiber by the second system without manual patching associated with the selection of the fiber at the second data center; providing, over the communications link, to the second system first information associated with one or more wavelengths of light associated with the fiber; receiving, over the communications link, from the second system second information associated with the one or more wavelengths of light associated with the fiber; and calculating a parameter associated with a test of the fiber based on the first information and the second information.

In some embodiments, the system and the second system are structurally identical.

In some embodiments, the plurality of fibers are at least a portion of a fiber trunk with ends at the first data center and the second data center In some embodiments, calculation of parameters for the plurality of fibers is in response to a single user input to the system.

In some embodiments, the first information associated with the one or more wavelengths of light is a request to generate the one or more wavelengths of light and the second information associated with the one or more wavelengths of light is a known property about the one or more wavelengths of light.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

BRIEF DESCRIPTION OF THE DRAWINGS

FIG. 4 illustrates an example method, according to various embodiments of the present technology.

Figure 1:
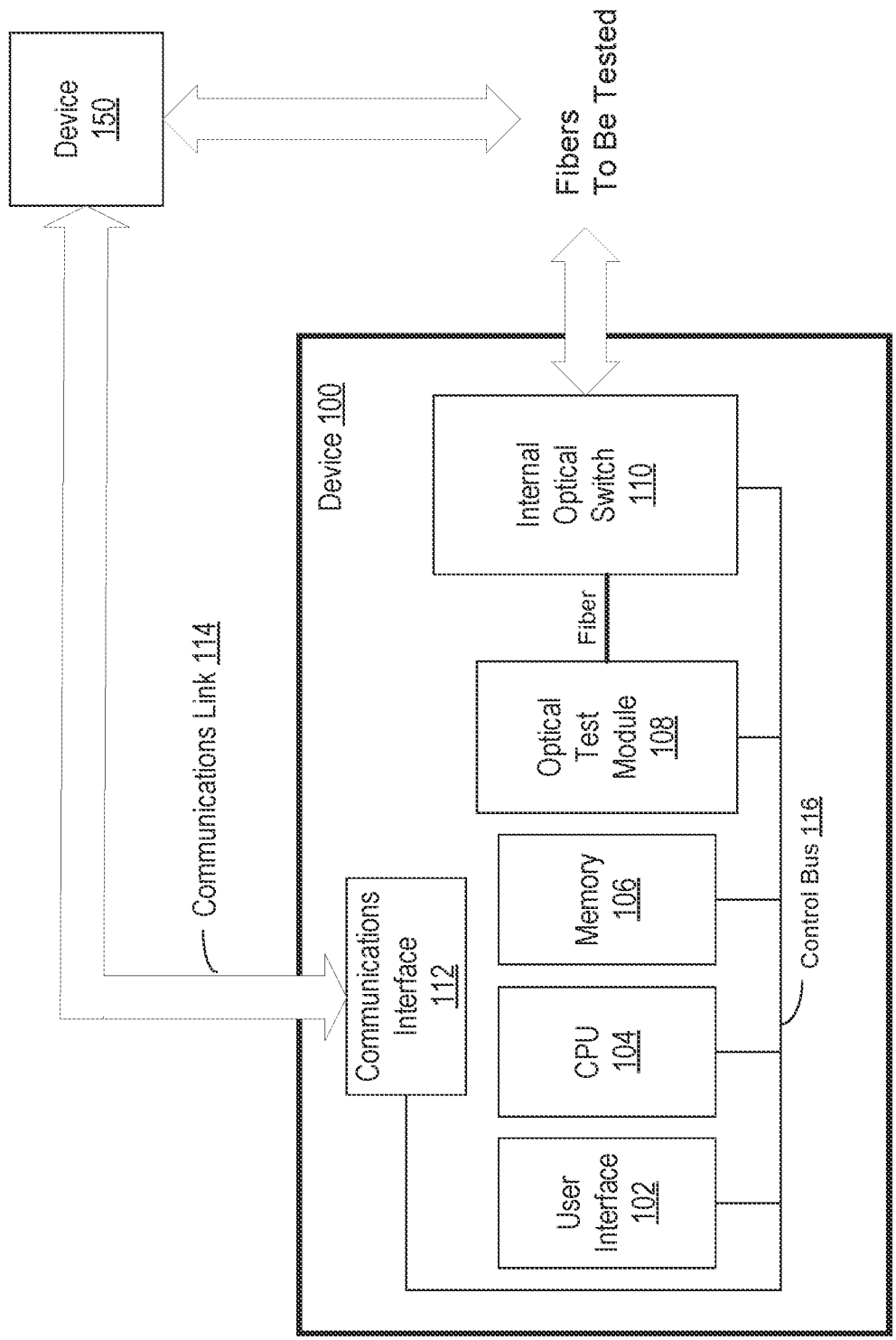
FIG. 1 illustrates a system in a first example configuration, according to various embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Optical networks are an important part of modern network infrastructure. Because signaling in optical networks is based on light (e.g., laser), optical networks can have a much higher data throughput than copper-based networks. Furthermore, latency associated with optical networks can be much lower than latency of copper-based networks. An optical network, such as a fiber optic network, can employ various types of fiber optic cables.

One type of fiber optic cable is a fiber trunk. A fiber trunk can be generally used for data center infrastructures and backbone applications. For example, a fiber trunk can be used to connect two data centers of an enterprise. A fiber trunk can reflect various configurations in which fibers are grouped, sub-grouped, and so on. The various configurations can encompass a wide range of fiber counts. The fiber counts of a fiber trunk have increased significantly over time. As just some examples, fiber trunks can have counts of 144 fibers, 3456 fibers, or even more fibers.

To ensure optimal data flow over a fiber optic network, fiber trunks can be tested to analyze their performance. A conventional technique to test a fiber trunk connecting two data centers involves significant expenditures of time and labor at both data centers. Different types of tests (e.g., insertion loss, optical return loss, fiber distance, etc.) can be run on the fiber trunk. For example, a first technician at the first data center can access a first end of the fiber trunk that terminates at the first data center. The first technician typically must manually select a particular fiber to test first among the multitude of fibers of the fiber trunk. Then, the first technician must communicate the selection of the particular fiber to a second technician at the second data center so that the second technician can select that same fiber. Given the security related constraints in data centers, the first technician and the second technician may use a dedicated talk set that supports voice communication between the technicians. Voice communications over the talk set between the technicians allow their labor (e.g., patching at each end) to be focused on the correct fiber and otherwise coordinated to properly conduct tests on the fiber.

In an example of a test for determining insertion loss, the first technician at the first data center can send a laser signal (or wavelength of light) with known power through a particular fiber at one end and request that the second technician at the second data center measure the received power of the laser signal at the other end of the fiber. Based on the known power at the first data center and the received power at the second data center, the insertion loss associated with the particular fiber for the direction from the first data center to the second data center can be determined. To test the same fiber for insertion loss in the reverse direction, the second technician at the second data center can send a laser signal with known power through the particular fiber and request that the first technician at the first data center measure the received power of the laser signal. Based on the known power at the second data center and the received power at the first data center, the insertion loss associated with the particular fiber for the direction from the second data center to the first data center also can be determined. Other types of tests (e.g., optical return loss, fiber distance), which may require different equipment (e.g., OTDR), also can be performed on the particular fiber in both directions. In many instances, the testing of a single fiber can take several minutes (e.g., 10 minutes). After testing of one fiber has concluded, the first technician may select a next fiber from among the multitude of fibers of the fiber trunk for testing. Using the talk set, the first technician again must communicate with the second technician to coordinate their manual efforts to test the next fiber, as discussed. In this conventional technique, the manual process of testing a fiber trunk painstakingly proceeds one fiber at a time with separate, dedicated patching labor for each fiber at each end, until all of the fibers are tested as desired. Given the large number of fibers that are often included in a fiber trunk, it is not uncommon for testing of a fiber trunk to require many weeks or months of burdensome technician labor at both ends.

An improved approach rooted in computer technology overcomes the foregoing and other disadvantages associated with conventional approaches specifically arising in the realm of computer technology. Based on computer technology, the present technology in various embodiments provides test equipment in different configurations that enable automated, end-to-end testing of fiber trunks so that fiber can be certified before service. The present technology enables automatic certification of large amounts of fibers that can be completed in a fraction of the time required by the labor-intensive and costly testing of conventional techniques.

In a first example configuration, a device (or system) can include various components, including an optical test module communicatively coupled (or connected) to an internal optical switch. The internal optical switch can be coupled directly or indirectly to a fiber trunk. The device also can include a communications interface that supports a high speed data communications link with a second device (or second system) at a remote location. The second device can be architected similarly or identically to the device. For example, the device and the second device can have the same components. Through the communications link, data can be communicated between the device and the second device to perform automated uni-directional testing and bi-directional testing at both ends of each fiber of the fiber trunk.

In a second example configuration, a system can include a device and an external optical switch. In various components, the device can include an optical test module communicatively couplable (or connectable) to the external optical switch. The external optical switch can be directly or indirectly coupled to the fiber trunk. The device also includes a communications interface that supports a high speed data communications link with a second system at a remote location. The second system can be architected similarly or identically to the system. For example, the system and the second system can have the same components. Through the communications link, data can be communicated between the system and the second system to perform automated uni-directional testing and bi-directional testing at both ends of each fiber of the fiber trunk.

In a third example configuration, a system can include a device and a plurality of external optical switches. The device can include various components, including an optical test module communicatively coupled to an internal optical switch. The internal optical switch can be couplable to each of the plurality of external optical switches through a respective fiber connection. The external optical switches can be directly or indirectly coupled to a fiber trunk. The system also can include a communications interface that supports a high speed data communications link with a second system at a remote location. The second system can be architected similarly or identically to the system. For example, the system and the second system can have the same components. Through the communications link, data can be communicated between the system and the second system to perform automated uni-directional testing and bi-directional testing at both ends of each fiber of the fiber trunk. These and other inventive features of the various embodiments of the present technology are discussed in more detail below.

FIG. 1 illustrates an example device (or system) 100, according to various embodiments associated with an example configuration of the present technology. In some embodiments, the device 100 can be test equipment to test fibers of a fiber optic network. For example, the fibers can be some or all of the fibers of a fiber trunk. The device 100 can include a user interface 102, a CPU 104, a memory 106, an optical test module 108, an internal optical switch 110, a communications interface 112, a communications link 114, and a control bus 116 that communicatively couples (or connects) all of the components of the device 100 and permits communication among all of the components of the device 100. The components (e.g., modules, elements, interfaces, blocks, functions, switches, etc.) shown in this figure and all figures herein are exemplary only, and other implementations may include additional, fewer, integrated, or different components. Some components may not be shown so as not to obscure relevant details. Some components may be simplified so as to allow focus on relevant details. The device 100 and the other systems and devices illustrated in the other figures herein can constitute test equipment that are special purpose computers. In some embodiments, the components of the device 100 are integrated into a single (or one) device or apparatus. As just one example, the device 100 can have approximate dimensions of 12 inches×16 inches×2 inches for a 32 port configuration or approximate dimensions of 12 inches×16 inches×4 inches for a 64 port configuration. The size of the device 100 can vary, and many variations are possible. In other embodiments, the components of the device 100 can be distributed over two or more devices or apparatuses.

The device 100 and a device (or system) 150 can be communicatively coupled through the communications link 114. In some embodiments, the device 100 and the device 150 can be related as master and slave. For example, during testing of fibers, the device 100 can assume the role of master while the device 150 can assume the role of slave, or vice versa. When the device 100 assumes the role of master, the device 100 can provide instructions over the communications link 114 to the device 150 to perform actions and to provide information in support of desired testing. Through the communications link 114, the device 100 and the device 150 can be coordinated for uni-directional testing and bi-directional testing of fibers. The device 100 and the device 150 can be geographically separate or remote from one another. For example, the device 100 can be located in a first data center at one end of a fiber trunk while the device 150 can be located in a second data center at the other end of the fiber trunk. The first data center and the second data center can be two different locations or premises of a common entity (or enterprise) or different entities.

The device 100 and the device 150 can be similar or identical to one another. In some embodiments, the device 100 and the device 150 can include the same components. In some embodiments, the device 100 and the device 150 can be functionally, structurally, or architecturally similar or identical. Accordingly, the description of the device 100 herein can apply equally or analogously to the device 150. Thus, relevant details about design and operation of the device 100 provided herein also apply to the device 150 in relation to their coordinated performance of fiber testing.

The device 100 can be coupled (or connected) to fibers of a fiber optic network that are to be tested. In some instances, the fibers can be associated with a fiber trunk. The number of fibers can vary based on the type of the fiber trunk. The count of fibers in a fiber trunk can be, for example, 32 fibers, 64 fibers, 144 fibers, 3,456 fibers, more fibers, or fewer fibers. In some instances, fibers of a fiber trunk can be coupled (or connected) to a fiber patch panel. In those instances, the device 100 and, in particular, the internal optical switch 110 can be coupled to the fiber patch panel through a fiber patch cord. In some instances, fibers can be terminated with connectors and the connectors can be directly connected to the internal optical switch 110.

Testing by the device 100 can be initiated by appropriate input to the user interface 102. The user interface 102 can be or include, for example, an LCD display, screen (e.g., touch screen), or keypad through which an operator of the device 100 can interact with the device. For example, the user interface 102 can provide a menu of selectable options for the operator to initiate various types of testing, such as testing related to insertion loss, optical return loss, and fiber distance. In some embodiments, after initial patching associated with all targeted fibers (e.g., all fibers of the fiber trunk, a portion of the fibers of the fiber trunk) at both ends, a single input or command to the device 100 that selects a test (or multiple tests) is sufficient to initiate, perform, and complete the test (or multiple tests) for the targeted fibers without the need for additional manual action (or inputs or commands) on the device 100 (or device 150). In some embodiments, a single input or command by an operator of the device 100 provided to the user interface 102 can cause all or a desired portion of a fiber trunk to be tested without the need for further inputs, commands, or other manual action by the operator. The user interface 102 also can provide information regarding test progress, test status, and test results.

The CPU 104 can control the device 100 (and the device 150 when the device 100 assumes the role of master and the device 150 assumes the role of slave), and perform operations to carry out tests. Performance of tests can be based on instructions (e.g., firmware, software) stored in the memory 106. The instructions can be associated with operations to conduct various types of tests, such as tests relating to insertion loss, optical return loss, fiber distance, etc. The CPU 104 can control the internal optical switch 110 so that fibers (or corresponding ports of an associated switch) of a fiber trunk are successively selected for testing and coupled to the optical test module 108. The CPU 104 also can cause the communications interface 112 to communicate with the device 150 over the communications link 114. The CPU 104 can send and receive over the communications link 114 various types of information associated with uni-directional testing and bi-directional testing of fibers. The various types of information provided over the communications link 114 can include any type of information that is suitable for, necessary to, or supportive of a performance of a test or a determination of a parameter associated with a test. The types of information that can be provided over the communications link 114 can include, for example, information that is required to determine a test parameter that is currently known or that may be used in the future. The types of information can include, for example, a selected fiber, a selected port, an indication or identification of a wavelength of light to be generated over a fiber, instructions to generate one or more wavelengths of light, instructions to measure one or more properties of wavelengths of light, measurements of properties of wavelengths of light, etc. For example, an identification of a selected fiber can be communicated to the device 150 over the communications link 114 so that the device 150 also can select that particular fiber for testing. In some instances, one or more wavelengths of light to be generated (e.g., 1310 nm, 1550 nm, 1610 nm, and any other wavelengths) over the selected fiber can be communicated to the device 150 over the communications link 114 so that the device 150 can measure the wavelengths of light for testing. The CPU 104 also can control generation and provision (transmission) by the device 100 of wavelengths of light (or signals) over selected fibers. For example, the CPU 104 can cause the optical test module 108 to generate and provide one or more wavelengths of light over a selected fiber. The one or more wavelengths of light can have a known characteristic or other property (e.g., known power level). In this example, the CPU 104 also can provide over the communications link 114 instructions for the device 150 to perform a measurement associated with a property of the one or more wavelengths of light received over the selected fiber by the device 150 (e.g., measured power level) and to provide the measurement back to the device 100 over the communications link 114. Or, for example, the CPU 104 can provide over the communications link 114 instructions for the device 150 to generate one or more wavelengths of light having a known property (e.g., known power level) for provision over a selected fiber to the device 100, and can cause a measurement of a property of the one or more wavelengths of light received over the selected fiber by the device 100. The CPU 104 can store various information about wavelengths of light transmitted and received over selected fibers. For example, the CPU 104 can cause values of known properties of generated wavelengths of light and values of measured properties of received wavelengths of light to be stored in the memory 106. The values of known properties of generated wavelengths of light and values of measured properties of received wavelengths of light can be used by the CPU 104 to calculate various parameters constituting or reflecting test results associated with various types of tests to certify a fiber. The CPU 104 can cause the test results to be presented through the user interface 102 for an operator of the device 100 or to be provided over the communications link 114 to the device 150 for presentation to an operator of the device 150.

The communications interface 112 can support and implement the communications link 114 that provides communications between the device 100 and the device 150. The communications link 114 can be one or more of various high speed data communications links. As just some examples, the communications link 114 can be Ethernet or Wi-Fi through an internal network (e.g., a network supported by an entity associated with the first data center and the second data center) or an external network, LTE (data modem) through a mobile network, or a dedicated fiber link supporting high speed data communications (e.g., Ethernet) between the device 100 and the device 150. In some embodiments, the dedicated fiber link between the device 100 and the device 150 employs a reserve fiber of a fiber trunk being tested by the device 100 and the device 150.

Under control of the CPU 104, the optical test module 108 can support testing of fibers of a fiber trunk. The optical test module 108 can include various components. In one implementation, the optical test module 108 can include an optical light source and an optical power meter. The optical light source can be configured to generate one or more wavelengths of light for provision across fibers of a fiber trunk to the device 150. In some embodiments, the optical light source can be implemented using one or a plurality of fixed wavelength lasers. Each fixed wavelength laser can produce a particular wavelength of light. In some embodiments, the optical light source can be implemented using one or more tunable lasers. The optical light source can be configured to generate one or more wavelengths of light at fixed or desired optical power levels. The optical light source can be calibrated such that each of the wavelengths of light is generated at a fixed, desired, or otherwise known optical power level. For example, the known optical power level of a wavelength of light transmitted by the optical light source over a selected fiber (as well as other characteristics of the wavelength of light) can be stored in the memory 106 and accessed by the CPU 104 in the calculation of various parameters associated with testing of the fiber. The optical power meter can be configured to measure optical power of wavelengths of light received by the optical test module 108. The optical power meter, for example, can measure an intensity of a wavelength of light transmitted over the selected fiber by the device 150 and, in particular, an optical light source of an optical test module of the device 150. The optical power of the wavelength of light transmitted over the selected fiber as measured by the optical power meter likewise can be stored in the memory 106 and accessed by the CPU 104 in the calculation of the various parameters associated with testing of the fiber. In addition to the optical light source and the optical power meter, the optical test module 108 can contain other components that support operation of the optical light source and the optical power meter and other components that otherwise provide functionality supportive of desired testing capabilities and configurations. Many variations are possible.

An example illustrates some aspects of the coordinated operation of the device 100 and the device 150 during testing of a fiber trunk. An operator of the device 100 can provide an input or command to the device 100 (e.g., the user interface 102) to select and initiate one or more desired tests. In some embodiments, when testing is initiated on a device (or system) of a coupled pair of devices (or systems), that device can assume the role of master and the other device can assume the role of slave. Accordingly, in this example, the device 100 assumes the role of master and the device 150 assumes the role of slave. Under instructions associated with a selected test that can be stored in the memory 106, the CPU 104 controls the internal optical switch 110 to select a first fiber to be tested from among the fibers to which the internal optical switch 110 is coupled. The internal optical switch 110 couples the first fiber to the optical test module 108 through a fiber connection. Using the communications interface 112, the CPU 104 causes an identification of the first fiber to be provided over the communications link 114 to the device 150 so that the same first fiber is likewise selected by the device 150. The CPU 204 also can communicate over the communications link 114 an identification or indication of the wavelength of light that is to be generated over the first fiber for receipt by the device 150. Among various tests that can be performed, assume that the selected test is, for example, a test relating to insertion loss. The CPU 104 controls the optical test module 108 to generate a wavelength of light at a known power level. The wavelength of light is provided through the fiber connection to the internal optical switch 110 and transmitted to the device 150 over the first fiber. The CPU 104 over the communications link 114 identifies the wavelength of the light provided over the first fiber for the device 150 and instructs the device 150 (and ultimately an optical test module of the device 150) to measure the power level of the wavelength of light received at the device 150. The CPU 104 over the communications link 114 instructs the device 150 to send over the communications link 114 the value of the measured power level of the wavelength of light received at the device 150 to the device 100. Based on the known power level of the wavelength of light and the measured power level of the wavelength of light, the CPU 104 can calculate insertion loss of the first fiber in a direction from the device 100 to the device 150. As just one example for purposes of illustration, the wavelength of light can be 1550 nm, the known power level of the wavelength of light can be 0 dBm, the measured power level of the wavelength of light can be −10 dBm, and accordingly the insertion loss can be 10 dBm. The values of the known power level, measured power level, and insertion loss for the first fiber in this direction from the device 100 to the device 150 can be stored in the memory 106 and provided for display through the user interface 102.

Continuing with this example, the CPU 104 over the communications link 114 instructs the device 150 to generate a wavelength of light at a known power level. The device 150 generates the wavelength of light through the optical test module of the device 150, The wavelength of light is provided through a fiber connection to an internal optical switch of the device 150 and transmitted to the device 100 over the first fiber. The CPU 104 over the communications link 114 instructs the device 150 to send over the communications link 114 an identification of the wavelength of the light provided over the first fiber and the value of the known power level of the wavelength of light transmitted from the device 150 to the device 100. The CPU 104 instructs the optical test module 108 of the device 100 to measure the power level of the wavelength of light received at the device 100. Based on the known power level of the wavelength of light and the measured power level of the wavelength of light, the CPU 104 can calculate insertion loss of the first fiber in a reverse direction from the device 150 to the device 100. The values of the known power level, measured power level, and insertion loss for the first fiber in this reverse direction from the device 150 to the device 100 also can be stored in the memory 106 and provided for display through the user interface 102. The CPU 104 can initiate other types of tests on the first fiber in the bi-directional manner described.

Then, in this example, the CPU 104 controls the internal optical switch 110 to select a second fiber from among the fibers of the fiber trunk to which the internal optical switch 110 is coupled. The internal optical switch 110 couples the second fiber to the optical test module 108. Using the communications interface 112, the CPU 104 causes an identification of the second fiber and an indication of the wavelength of light carried by the second fiber to be provided over the communications link 114 to the device 150 so that the same second fiber is likewise selected by the device 150 and the wavelength of light can be measured by the device 150. Bi-directional testing of the second fiber proceeds in the manner described above for the first fiber. Thereafter, a third fiber is selected and bi-directional testing of the third fiber likewise proceeds in the manner described above for the first fiber. The process automatically continues in this manner to the next fiber (e.g., fourth fiber, fifth fiber, . . . nth fiber) on a fiber-by-fiber basis until all of the fibers to which the internal optical switch 110 is coupled are tested. The foregoing example is for purposes of illustration, and many variations are possible. For example, the calculation of parameters associated with a test can be performed by the device 100, or the device 150, or both. Likewise, information associated with a test can be stored or displayed by the device 100, or the device 150, or both.

The foregoing example relates to a testing scenario in which the device 100 assumes the role of master and the device 150 assumes the role of slave. In other examples, the device 150 can assume the role of master and the device 100 can assume the role of slave. Further, the foregoing example relates to testing associated with insertion loss. In other examples, the device 100 (or the device 150) can operate to perform any other suitable tests, such as tests relating to optical return loss, fiber distance, etc. Moreover, in addition to bi-directional testing, uni-directional testing (e.g., fiber distance based on OTDR) can also be performed by the device 100 and the device 150. For example, the device 100, when it assumes the role of master, can generate pulses of a wavelength of light (e.g., 1550 nm) and instruct the device 150, when it assumes the role of slave, to remain quiet (inactive) while the device 100 performs measurements. After testing is completed by the device 100, the device 100 over the communications link 114 can instruct the device 150 to generate pulses of a wavelength of light for measurement by the device 150 while the device 100 remains quiet. The measurements taken by the device 150 can be communicated to the device 100 over the communications link 114.

After all or some of the fibers of a fiber trunk are tested, the device 100 (or the device 150) can generate a test report. The test report can provide information relating to test results and associated parameter values on a fiber-by-fiber basis. For example, the test report can identify fibers associated with parameter values that satisfy associated threshold values and can indicate that the fibers exhibit satisfactory performance. As another example, the test report can also can identify fibers associated with parameter values that do not satisfy associated threshold values and can indicate that the fibers exhibit unsatisfactory performance. In addition, the test report can provide aggregated test results that provide an indication about the performance level of the fiber trunk overall. The test results can be presented to the operator of the device 100 through the user interface 102 (and the operator of the device 150 through a user interface of the device 150).

The present technology, as described above and below, accordingly enables automated, end-to-end, high speed testing of a potentially large number of fibers in a timeframe that is substantially shorter than the timeframe required by labor-intensive conventional techniques. In accordance with the present technology, technicians at a first data center in which the device 100 is located (and technicians at a second data center in which the device 150 is located) need only patch once prior to testing of fibers. The present technology thus avoids the need to successively or continuously patch as each subsequent fiber of a fiber trunk is painstakingly tested one after the other in accordance with conventional techniques. After patching all desired fibers for testing once, the present technology enables each fiber in a fiber trunk to be sequentially and automatically tested without further manual effort by technicians. Further, the present technology provides data communications over a high speed data communications link to enable automated, coordinated testing operations performed on each fiber by synchronized devices at each fiber end, which avoids the need in conventional techniques for technicians at both data centers to engage in cumbersome, slow voice communications through talk sets to synchronize their efforts for each fiber. These and other advantages provided by the present technology result in significant improvements in testing time and significant reductions in labor and cost.

Figure 2:
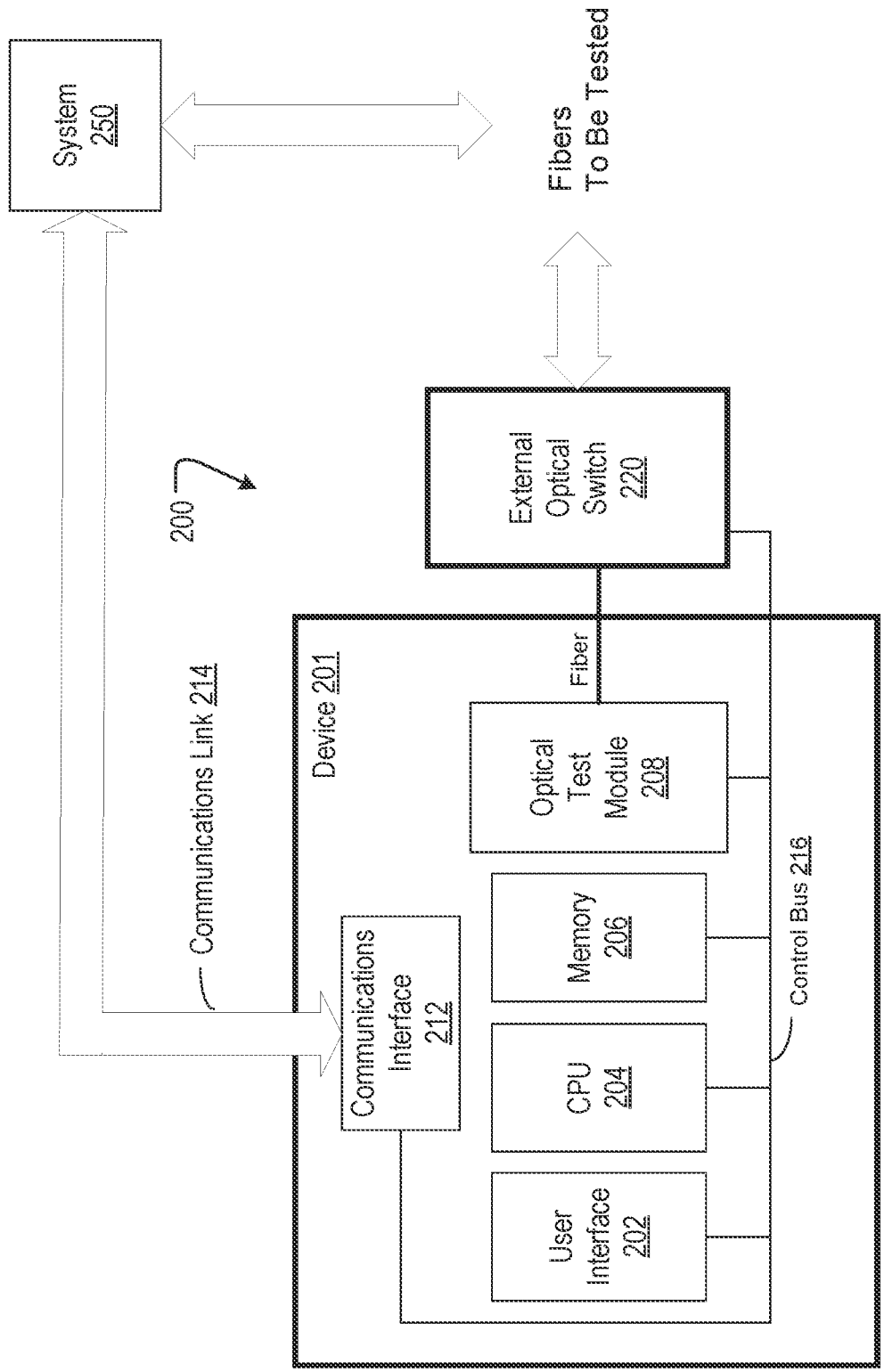
FIG. 2 illustrates a system in a second example configuration, according to various embodiments of the present technology.

FIG. 2 illustrates an example system 200 including a device 201 and an external optical switch 220, according to various embodiments associated with another example configuration of the present technology. The system 200 can be test equipment to test fibers of a fiber optic network. The system 200 allows for testing of a large number of fibers by separating the external optical switch 220 and the device 201 into separate but couplable (or connectable) apparatuses. The external optical switch 220 can be variable in size and designed to receive a large or massive number of fibers. Accordingly, the form factor of the device 201 can be maintained to optimize its portability and ease of handling. As just one example, the device 201 can have approximate dimensions of 7 inches×7 inches×2 inches. As just another example, the external optical switch 220 can have approximate dimensions of 14 inches×16 inches×2 inches for a 32 port configuration or approximate dimensions of 14 inches×16 inches×4 inches for a 64 port configuration. The size of the device 201 and the size of the external optical switch 220 can vary, and many variations are possible.

The device 201 can include a user interface 202, a CPU 204, a memory 206, an optical test module 208, a communications interface 212, a communications link 214, and a control bus 216 that couples (or connects) all of the components in the device 201 and the external optical switch 220, and permits communication among all of the components in the device 201 and the external optical switch 220. The external optical switch 220 is couplable to the device 201. The external optical switch 220 is couplable (or connectable) to the optical test module 208 through a fiber connection. The components (e.g., modules, elements, interfaces, blocks, functions, switches, etc.) shown in this figure and all figures herein are exemplary only, and other implementations may include additional, fewer, integrated, or different components. Some components may not be shown so as not to obscure relevant details. Some components may be simplified so as to allow focus on relevant details. The system 200 can constitute test equipment that are special purpose computers. In some embodiments, the components of the device 201 are integrated into a single (or one) device or apparatus. In other embodiments, the components of the device 201 can be distributed over two or more devices or apparatuses. In some embodiments, the external optical switch 220 is integrated into a single (or one) device or apparatus.

The system 200 and a system 250 can be communicatively coupled through the communications link 214. In some embodiments, the system 200 and the system 250 can be related as master and slave. For example, during testing of a fiber trunk, the system 200 can assume the role of master while the system 250 can assume the role of slave, or vice versa. For example, when the system 200 assumes the role of master, the system 200 can provide instructions over the communications link 214 to the system 250 to perform actions and to provide information in support of desired testing. The system 200 and the system 250 are capable of uni-directional testing and bi-directional testing of fibers. The system 200 and the system 250 can be geographically separate or remote from one another. For example, the system 200 can be located in a first data center at one end of a fiber trunk while the system 250 can be located in a second data center at the other end of the fiber trunk. The first data center and the second data center can be two locations or premises of a common entity (or enterprise) or different entities.

The communications interface 212 can support and implement the communications link 214 providing communications between the system 200 and the system 250. The communications link 214 can be one or more of various high speed data communications links. As just some examples, the communications link 214 can be Ethernet or Wi-Fi through an internal network (e.g., a network supported by an entity associated with the first data center and the second data center) or an external network, LTE (data modem) through a mobile network, or a dedicated fiber link supporting high speed data communications (e.g., Ethernet) between the system 200 and the system 250. In some embodiments, the dedicated fiber link between the system 200 and the device 250 employs a reserve fiber of a fiber trunk being tested by the system 200 and the system 250. The types of information that can be communicated over the communications link 214 can include the types of information that can be communicated over the communications link 114, as described above.

The system 200 and the system 250 can be similar or identical to one another. In some embodiments, the system 200 and the system 250 can include the same components. In some embodiments, the system 200 and the system 250 can be functionally, structurally, or architecturally similar or identical. Accordingly, the description of the system 200 herein can apply equally or analogously to the system 250. Thus, relevant details about design and operation of the system 200 provided herein also apply to the system 250 in relation to their coordinated performance of fiber testing.

The external optical switch 220 can be coupled (or connected) to fibers of a fiber optic network that are to be tested. In some instances, the fibers can be associated with a fiber trunk. The number of fibers can vary based on the type of the fiber trunk. The count of fibers in a fiber trunk can be, for example, 144 fibers, 3,456 fibers, more fibers, or fewer fibers. In some instances, fibers of a fiber trunk can be coupled (or connected) to a fiber patch panel. The system 200 and, in particular, the external optical switch 220 can be coupled to the fiber patch panel through a fiber patch cord. In some instances, fibers can be terminated with connectors and the connectors can be directly connected to the external optical switch 220.

The system 200 can test fibers coupled to the external optical switch 220 when the external optical switch 220 is coupled to the optical test module 208 of the device 201. The CPU 204 can control the external optical switch 220 to select a first fiber (or corresponding port of the external optical switch 220) from among the fibers to which the external optical switch 220 is coupled. An identification of the first fiber can be provided to the system 250 over the communications link 214 to perform uni-directional testing and bi-directional testing at both ends of the first fiber. The function and operation of the components of the system 200 for testing fibers are substantially the same as the function and operation of the same (or commonly named) components of the device 100, as discussed above. After testing of the first fiber is completed, the CPU 204 can control the external optical switch 220 to select a second fiber from among the fibers to which the external optical switch is coupled. An identification of the second fiber can be provided to the system 250 over the communications link 214 to perform uni-directional testing and bi-directional testing at both ends of the second fiber. The testing can continue in this manner, one fiber after another, until all or a desired portion of the fibers are tested. As described above, the advantages provided by the present technology result in significant improvements in testing time and significant reductions in labor and cost.

Figure 3:
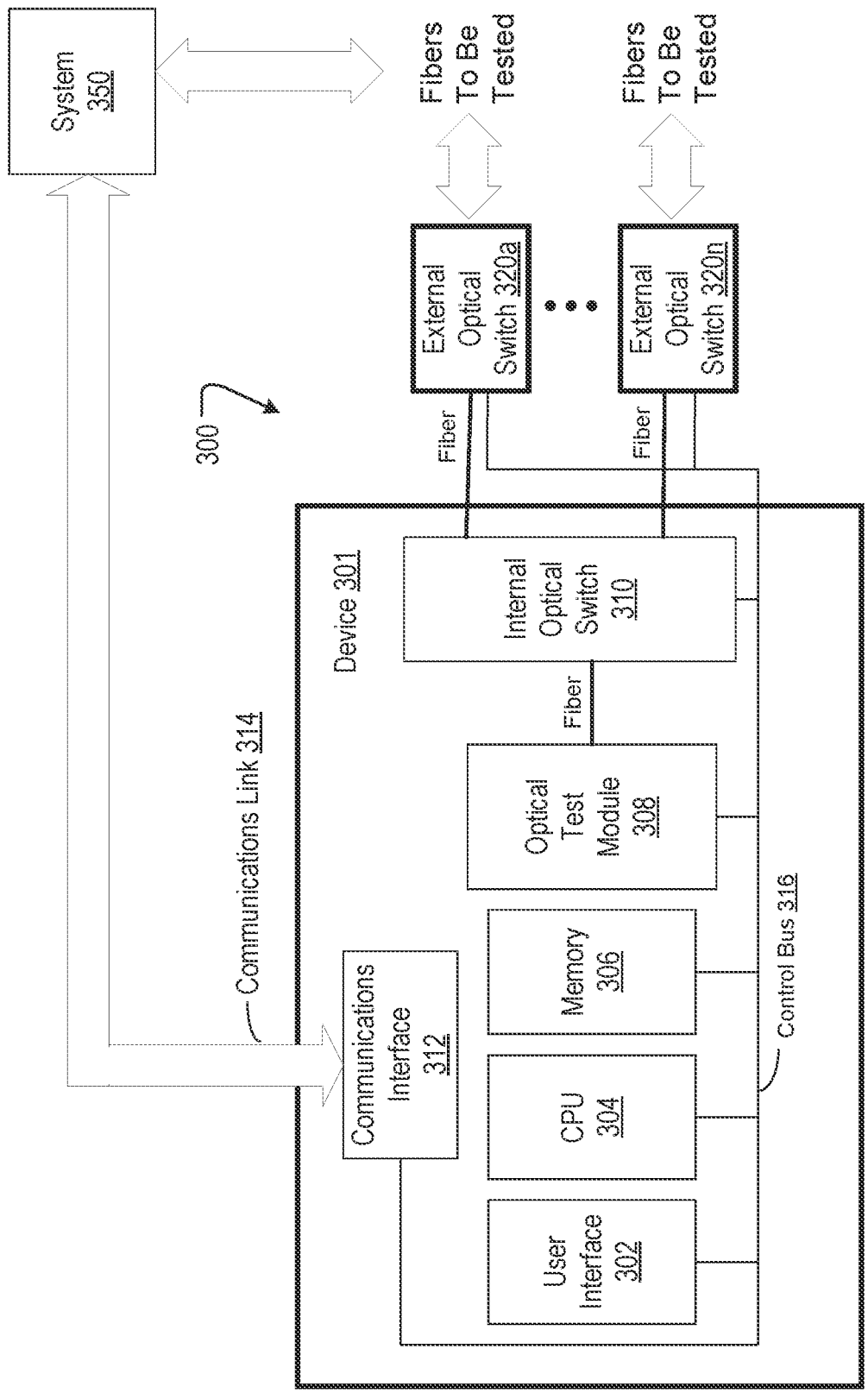
FIG. 3 illustrates a system in a third example configuration according to various embodiments of the present technology.

FIG. 3 illustrates an example system 300 including a device 301 and external optical switches 320a-320n, according to various embodiments associated with yet another example configuration of the present technology. The system 300 can be test equipment to test fibers of a fiber optic network. In various embodiments, the external optical switches 320a-320n can be one external optical switch or any suitable number of separate external optical switches (e.g., two external optical switches, five external optical switches, eight external optical switches, etc.) to carry out desired testing. The system 300 allows for testing of a large number of fibers by separating the device 301 and the external optical switches 320a-320n into separate but couplable (or connectable) apparatuses. The external optical switches 320a-320n can be variable in size and designed to receive a large or massive number of fibers. The use of a plurality of external optical switches 320a-320n allows each external optical switch to have a manageable form factor and avoids the need to potentially use a single external optical switch with cumbersome or potentially overwhelming physical dimensions. Further, the use of a plurality of external optical switches 320a-320n helps to maintain the form factor of the device 301 and to optimize the portability and ease of handling of the device 301. As just one example, the device 301 can have approximate dimensions of 12 inches×16 inches×2 inches for a 32 port configuration or approximate dimensions of 12 inches×16 inches×4 inches for a 64 port configuration. As just another example, each external optical switch of the external optical switches 320a-320n can have approximate dimensions of 14 inches× 16 inches×2 inches for a 32 port configuration or approximate dimensions of 14 inches×16 inches×4 inches for a 64 port configuration. The size of the device 301 and the size of each of the external optical switches 320a-320n can vary, and many variations are possible.

The device 301 can include a user interface 302, a CPU 304, a memory 306, an optical test module 308, an internal optical switch 310, a communications interface 312, a communications link 314, and a control bus 316 that couples (or connects) all of the components in the device 301 and the external optical switches 320a-320n, and permits communication among all of the components in the device 301 and the external optical switches 320a-320n. The external optical switches 320a-320n are couplable (or connectable) to the device 301. Each of the external optical switches 320a-320n is couplable to the internal optical switch 310 through an associated fiber connection. The components (e.g., modules, elements, interfaces, blocks, functions, switches, etc.) shown in this figure and all figures herein are exemplary only, and other implementations may include additional, fewer, integrated, or different components. Some components may not be shown so as not to obscure relevant details. Some components may be simplified so as to allow focus on relevant details. The system 300 can constitute test equipment that are special purpose computers. In some embodiments, the components of the device 301 are integrated into a single (or one) device or apparatus. In other embodiments, the components of the device 301 can be distributed over two or more devices or apparatuses. In some embodiments, the external optical switches 320a-320n are separate devices or apparatuses. In different instances, different numbers of external optical switches 320a-320n can be coupled to the device 301.

The system 300 and a system 350 can be communicatively coupled through the communications link 314. In some embodiments, the system 300 and the system 350 can be related as master and slave. For example, during testing of a fiber trunk, the system 300 can assume the role of master while the system 350 can assume the role of slave, or vice versa. For example, when the system 300 assumes the role of master, the system 300 can provide instructions over the communications link 314 to the system 350 to perform actions and to provide information in support of desired testing. The system 300 and the system 350 are capable of uni-directional testing and bi-directional testing of fibers. The system 300 and the system 350 can be geographically separate or remote from one another. For example, the system 300 can be located in a first data center at one end of a fiber trunk while the system 350 can be located in a second data center at the other end of the fiber trunk. The first data center and the second data center can be two locations or premises of a common entity (or enterprise) or different entities.

The communications interface 312 can support and implement the communications link 314 providing communications between the system 300 and the system 350. The communications link 314 can be one or more of various data communications links. As just some examples, the communications link 314 can be Ethernet or Wi-Fi through an internal network (e.g., a network supported by an entity associated with the first data center and the second data center) or an external network, LTE (data modem) through a mobile network, or a dedicated fiber link supporting high speed data communications (e.g., Ethernet) between the system 300 and the system 350. In some embodiments, the dedicated fiber link between the system 300 and the device 350 employs a reserve fiber of a fiber trunk being tested by the system 300 and the system 350. The types of information that can be communicated over the communications link 314 can include the types of information that can be communicated over the communications link 114, as described above.

The system 300 and the system 350 can be similar or identical to one another. In some embodiments, the system 300 and the system 350 can include the same components. In some embodiments, the system 300 and the system 350 can be functionally, structurally, or architecturally similar or identical. Accordingly, the description of the system 300 herein can apply equally or analogously to the system 350. Thus, relevant details about design and operation of the system 300 provided herein also apply to the system 350 in relation to their coordinated performance of fiber testing.

Each of the external optical switches 320a-320n can be coupled (or connected) to respective portions of fibers of a fiber optic network that are to be tested. In some instances, the fibers can be associated with a fiber trunk. The external optical switches 320a-320n can be any suitable number of external optical switches. As just one example, the external optical switches 320a-320n can include a first external optical switch, a second external optical switch, a third external optical switch, and so on. In this example, the first external optical switch can be coupled to a first portion of the fibers, the second external optical switch can be coupled to a second portion of the fibers, the third external optical switch can be coupled to a third portion of the fibers, and so on. The number of fibers can vary based on the type of the fiber trunk. The count of fibers in a fiber trunk can be, for example, 144 fibers, 3,456 fibers, more fibers, or fewer fibers. In some instances, fibers of a fiber trunk can be coupled (or connected) to a fiber patch panel. In those instances, the system 300 and, in particular, the external optical switches 320a-320n can be coupled to the fiber patch panel through fiber patch cords. In some instances, fibers can be terminated with connectors and the connectors can be directly connected to the external optical switches 320a-320n.

The system 300 can test fibers coupled to the external optical switches 320a-320n when the external optical switches 320a-320n are coupled (or connected) to the internal optical switch 310 of the device 301. Each of the external optical switches 320a-320n can be coupled to the internal optical switch 310 through an associated, respective port of the internal optical switch 310. The CPU 304 can control the internal optical switch 310, which can function as a master switch, and the external optical switches 320a-320n to select fibers and to connect the fibers to the optical test module 308. The CPU 304 can control the internal optical switch 310 and a first external optical switch of the external optical switches 320a-320n to select a first fiber (or corresponding port of the first external optical switch) from among the fibers to which the first external optical switch is coupled. An identification of the first fiber can be provided to the system 350 over the communications link 314 to perform uni-directional testing and bi-directional testing at both ends of the first fiber. The function and operation of the components of the system 300 for testing fibers are substantially the same as the function and operation of the same (or commonly named) components of the device 100, as discussed above. After testing of the first fiber is completed, the CPU 304 can control the internal optical switch 310 and first external optical switch of the external optical switches 320a-320n to select a second fiber from among the fibers to which the first external optical switch is coupled. An identification of the second fiber can be provided to the system 350 over the communications link 314 to perform uni-directional testing and bi-directional testing at both ends of the second fiber. The testing can continue in this manner, one fiber after another, until all or a desired portion of the fibers to which the first external optical switch of the external optical switches 320a-320n is coupled are tested.

After completion of testing of the fibers to which the first external optical switch of the external optical switches 320a-320n is coupled, the CPU 304 can control the internal optical switch 310 and a second external optical switch of the external optical switches 320a-320n to select a first fiber from among the fibers to which the second external optical switch is coupled. An identification of the first fiber can be provided to the system 350 over the communications link 314 to perform uni-directional testing and bi-directional testing at both ends of the first fiber. The testing can continue in this manner, one fiber after another, until all or a desired portion of the fibers to which the second external optical switch of the external optical switches 320a-320n is coupled are tested. The testing can continue in this cascading manner to test each fiber to which each additional external optical switch (e.g., a third external optical switch, a fourth external optical switch, and so on) of the external optical switches 320a-320n is coupled until testing of all of the fibers to which the external optical switches 320a-320n are coupled is completed. As discussed, the present technology realizes significant advancements in testing time and significant elimination of labor and cost in comparison to conventional techniques.

FIG. 4 illustrates an example method 400, according to various embodiments of the present technology. It should be appreciated that there can be additional, fewer, or alternative steps performed in similar or alternative orders, or in parallel, within the scope of the various embodiments discussed herein unless otherwise stated.

The example method 400, successively for each fiber of a plurality of fibers to which a system at a first data center and a second system at a second data center are coupled (or connected) at block 402, can perform, via the system, the following:

At block 404, the example method 400 can select the fiber without manual patching associated with selection of the fiber at the first data center;

At block 406, the example method 400 can provide, over a communications link between the system and the second system, to the second system an identification of the fiber to cause selection of the fiber by the second system without manual patching associated with the selection of the fiber at the second data center;

At block 408, the example method 400 can provide, over the communications link, to the second system first information associated with a wavelength of light associated with the fiber;

At block 410, the example method 400 can receive, over the communications link, from the second system second information associated with the wavelength of light associated with the fiber; and At block 412, the example method 400 can calculate a parameter associated with a test of the fiber based on the first information and the second information.

It is contemplated that there can be many other uses, applications, and/or variations associated with the various embodiments of the present technology.

Hardware Implementation

Figure 5:
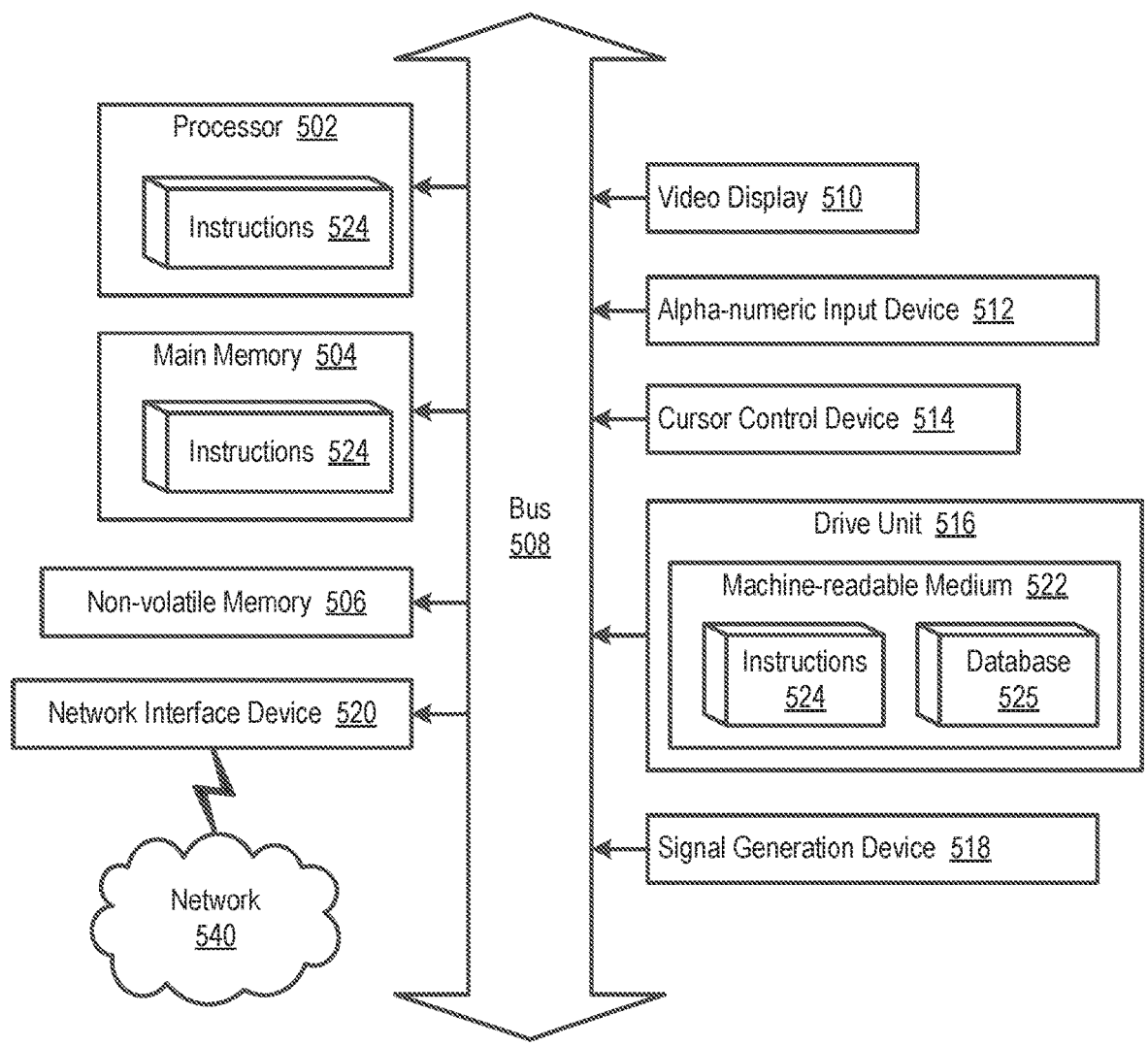
FIG. 5 illustrates an example of a computing system to implement one or more embodiments described herein, according to various embodiments of the present technology.

The foregoing processes and features can be implemented by a wide variety of machine and computing system architectures and in a wide variety of network and computing environments. FIG. 5 illustrates an example of a computing system (or computing device) 500 that may be used to implement one or more of the embodiments described herein according to various embodiments of the present technology. The computing system 500 includes sets of instructions 524 for causing the computing system 500 to perform the processes and features discussed herein. The computing system 500 may be connected (e.g., networked) to other machines and/or computer systems. In a networked deployment, the computing system 500 may operate in the capacity of a server or a client machine in a client-server network environment, or as a peer machine in a peer-to-peer (or distributed) network environment.

The computing system 500 includes a processor 502 (e.g., a central processing unit (CPU), a graphics processing unit (GPU), or both), a main memory 504, and a nonvolatile memory 506 (e.g., volatile RAM and non-volatile RAM, respectively), which communicate with each other via a bus 508. In some embodiments, the computing system 500 can be a desktop computer, a laptop computer, personal digital assistant (PDA), or mobile phone, for example. In one embodiment, the computing system 500 also includes a video display 510, an alphanumeric input device 512 (e.g., a keyboard), a cursor control device 514 (e.g., a mouse), a drive unit 516, a signal generation device 518 (e.g., a speaker) and a network interface device 520.

In one embodiment, the video display 510 includes a touch sensitive screen for user input. In one embodiment, the touch sensitive screen is used instead of a keyboard and mouse. The disk drive unit 516 includes a machine-readable medium 522 on which is stored one or more sets of instructions 524 (e.g., software) embodying any one or more of the methodologies or functions described herein. The instructions 524 can also reside, completely or at least partially, within the main memory 504 and/or within the processor 502 during execution thereof by the computing system 500. The instructions 524 can further be transmitted or received over a network 540 via the network interface device 520. In some embodiments, the machine-readable medium 522 also includes a database 525.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 506 may also be a random access memory. The non-volatile memory 506 can be a local device coupled directly to the rest of the components in the computing system 500. A non-volatile memory that is remote from the system, such as a network storage device coupled to any of the computer systems described herein through a network interface such as a modem or Ethernet interface, can also be used.

While the machine-readable medium 522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computing system 500 to perform any one or more of the processes and features described herein.

In general, routines executed to implement the embodiments of the invention can be implemented as part of an operating system or a specific application, component, program, object, module or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 500 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a limiting or restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in both method and apparatus modes.

Further, each of the various elements of the invention and claims may also be achieved in a variety of manners. This technology should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A device comprising:
   an internal optical switch internal to the device couplable to a plurality of fibers, configured to automatically select fibers in succession from the plurality of fibers for testing;
   an optical test module internal to the device, coupled to the internal optical switch, configured to generate or receive one or more wavelengths of light on each selected fiber of the plurality of fibers; and
   a communications interface, coupled to the internal optical switch and the optical test module, configured to establish a communications link between the device and a second device to test each selected fiber, wherein the device is configured to provide over the communications link instructions to the second device to generate at least one wavelength of light over a selected fiber.

2. The device of claim 1, wherein components of the second device are the same as components of the device.

3. The device of claim 1, wherein the plurality of fibers are at least a portion of a fiber trunk.

4. The device of claim 1, wherein the communications interface is further configured to provide and receive information about the one or more wavelengths of light on each selected fiber over the communications link.

5. The device of claim 1, wherein a calculation of a parameter associated with a test of each selected fiber is based at least in part on information about the one or more wavelengths of light on the fiber.

6. The device of claim 1, wherein the internal optical switch is configured to automatically select fibers in succession from the plurality of fibers for coupling to the optical test module without a need for successive manual patching of selected fibers at ends of the plurality of fibers.

7. The device of claim 1, further comprising:
   at least one external optical switch external to the device, couplable between the internal optical switch and at least a portion of the plurality of fibers, the at least one external optical switch couplable with the internal optical switch through a fiber connection.

8. The device of claim 7, wherein a first external optical switch couplable with the internal optical switch is couplable to a first portion of the plurality of fibers and a second external optical switch couplable with the internal optical switch is couplable to a second portion of the plurality of fibers.

9. The device of claim 8, wherein the internal optical switch includes a first port associated with the first external optical switch and a second port associated with the second external optical switch, the first port and the second port configured to support transmission of wavelengths of light over, respectively, the first portion of the plurality of fibers and the second portion of the plurality of fibers.

10. The device of claim 1, wherein the communications link comprises a fiber of the plurality of fibers that is dedicated to carrying test information comprising the instructions to the second device to generate at least one wavelength of light.

11. A system comprising:
an external optical switch external to the system, couplable to a plurality of fibers, configured to automatically select fibers in succession from the plurality of fibers for testing;
an optical test module, couplable to the external optical switch, configured to generate or receive one or more wavelengths of light over each selected fiber of the plurality of fibers; and
a communications interface, coupled to the optical test module, configured to establish a communications link between the system and a second system to test each selected fiber,
wherein the system is configured to generate at least one wavelength of light and is configured to provide instructions to the second system to generate at least one wavelength of light over a selected fiber.

12. The system of claim 11, wherein components of the second system are the same as components of the system.

13. The system of claim 11, wherein the system is configured to operate as master at a first data center and the second system is configured to operate as slave at a second data center remote from the first data center.

14. The system of claim 11, wherein the plurality of fibers are at least a portion of a fiber trunk.

15. The system of claim 11, wherein the communications interface is further configured to provide and receive information about the one or more wavelengths of light on each selected fiber over the communications link.

16. A system comprising:
at least one processor; and
a memory storing instructions that, when executed by the at least one processor, cause the system to perform: successively for each fiber of a plurality of fibers to which the system at a first data center and a second system at a second data center are connected:
selecting the fiber without manual patching associated with selection of the fiber at the first data center;
providing, over a communications link between the system and the second system, to the second system an identification of the fiber to cause selection of the fiber by the second system without manual patching associated with the selection of the fiber at the second data center;
providing, over the communications link, to the second system first information associated with one or more wavelengths of light associated with the fiber, wherein the first information is a request to generate the one or more wavelengths of light over a selected fiber;
receiving, over the communications link, from the second system second information associated with the one or more wavelengths of light associated with the fiber; and
calculating a parameter associated with a test of the fiber based on the first information and the second information.

17. The system of claim 16, wherein the system and the second system are structurally identical.

18. The system of claim 16, wherein the plurality of fibers are at least a portion of a fiber trunk with ends at the first data center and the second data center.

19. The system of claim 16, wherein calculation of parameters for the plurality of fibers is in response to a single user input to the system.

20. The system of claim 16, wherein the second information associated with the one or more wavelengths of light is a known property about the one or more wavelengths of light.

* * * * *